(12) United States Patent
Min-Chen

(10) Patent No.: US 6,179,254 B1
(45) Date of Patent: Jan. 30, 2001

(54) DETACHABLE WRIST REST FOR A KEYBOARD

(75) Inventor: Tsung Min-Chen, Taipei Hsien (TW)

(73) Assignee: Chicony Electronics Co., Ltd., Taipei Hsien (TW)

( * ) Notice: Under 35 U.S.C. 154(b), the term of this patent shall be extended for 0 days.

(21) Appl. No.: 09/368,155

(22) Filed: Aug. 5, 1999

(51) Int. Cl.⁷ ..................................................... B68G 5/00

(52) U.S. Cl. ..................... 248/118.1; 248/918; 400/715

(58) Field of Search ................... 248/118, 118.1, 248/918, 345.1; D14/114, 115; 400/715

(56) References Cited

U.S. PATENT DOCUMENTS

| | | | |
|---|---|---|---|
| D. 417,210 | * 11/1999 | Prokop | D14/115 |
| 5,386,956 | * 2/1995 | Hatcher | 248/118 |

* cited by examiner

*Primary Examiner*—Ramon O. Ramirez
(74) *Attorney, Agent, or Firm*—Rosenberg, Klein & Lee

(57) ABSTRACT

A detachable wrist rest for a keyboard has a generally U-shaped body with the recessed portion conformed to and firmly attached to the lower part of keyboard by a pair of snap based mechanisms each provided between a side junction contacting keyboard and wrist rest including a first snap member on an outer surface of the keyboard and a second snap member on an inner surface of the wrist rest. Disposition of first and second snap members may be reversed. Various snap based mechanisms are disclosed.

12 Claims, 4 Drawing Sheets

FIGF.4A

DETACHABLE WRIST REST FOR A KEYBOARD

BACKGROUND OF THE INVENTION

1. Field of the Invention

The present invention relates to a detachable wrist rest for a keyboard.

2. Description of Related Art

A prior art wrist rest for a keyboard, such as disclosed in a Taiwanese Pat. Publication No. 233,824, has many drawbacks. It is known that the wrist rest has a curved outer surface toward a keyboard user is a better design for easing the contact between muscle and wrist. However, the wrist rest of such prior art is generally shaped upwardly toward the user. As such, user may feel a musculoskeletal discomfort. Further, the length of wrist rest is generally equal to that of the keyboard. As such, wrist may suspend in the air when operating the keys near left or right side of the keyboard, i.e., wrist is not supported by wrist rest. In addition, wrist rest is separated from keyboard as such wrist rest is prone to slidingly move or fall to ground inadvertently. Lastly, wrist rest is securely attached to keyboard when assembled as opposed to separately assemble due to the disassembly of wrist rest and keyboard is difficult. As such, container for packing wrist rest and keyboard is relatively large, resulting in an increase in the manufacturing cost.

Thus, it is desirable to provide an improved detachable wrist rest for a keyboard to overcome the above drawbacks of prior art.

SUMMARY OF THE INVENTION

It is an object of the present invention to provide a detachable wrist rest for a keyboard having a generally U-shaped body with the recessed portion conformed to and firmly attached to the lower part of keyboard by a pair of snap based mechanisms, i.e., the length of wrist rest is longer than that of keyboard for preventing wrist from suspending in the air when operating the keys near left or right side of keyboard. Wrist rest has a curved portion toward a keyboard user for easing the contact between muscle and wrist. Wrist rest may rotatably move to top of keyboard after assembled in order to facilitating packing and thus container for packing wrist rest and keyboard is relatively small, resulting in a reduction in the manufacturing cost.

The above and other objects, features and advantages of the present invention will become apparent from the following detailed description taken with the accompanying drawings.

BRIEF DESCRIPTION THE DRAWINGS

FIGS. 4A–4D are first, second, third, and fourth embodiments of a snap based mechanism according to the present invention respectively.

DETAILED DESCRIPTION OF THE PREFERRED EMBODIMENTS

Figure 1:
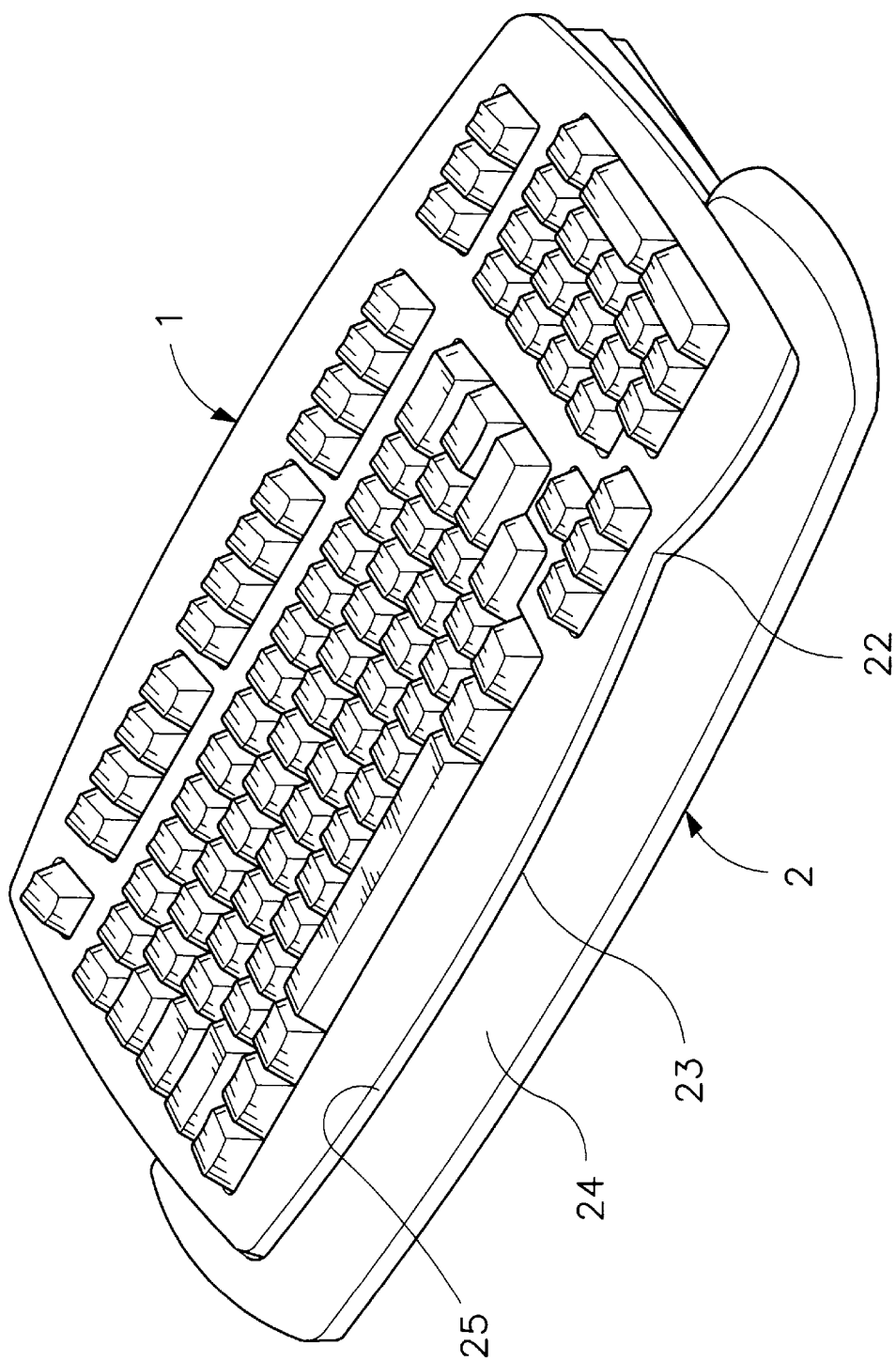
FIG. 1 is a perspective view of a detachable wrist rest assembled with a keyboard according to the present invention.
Figure 2:
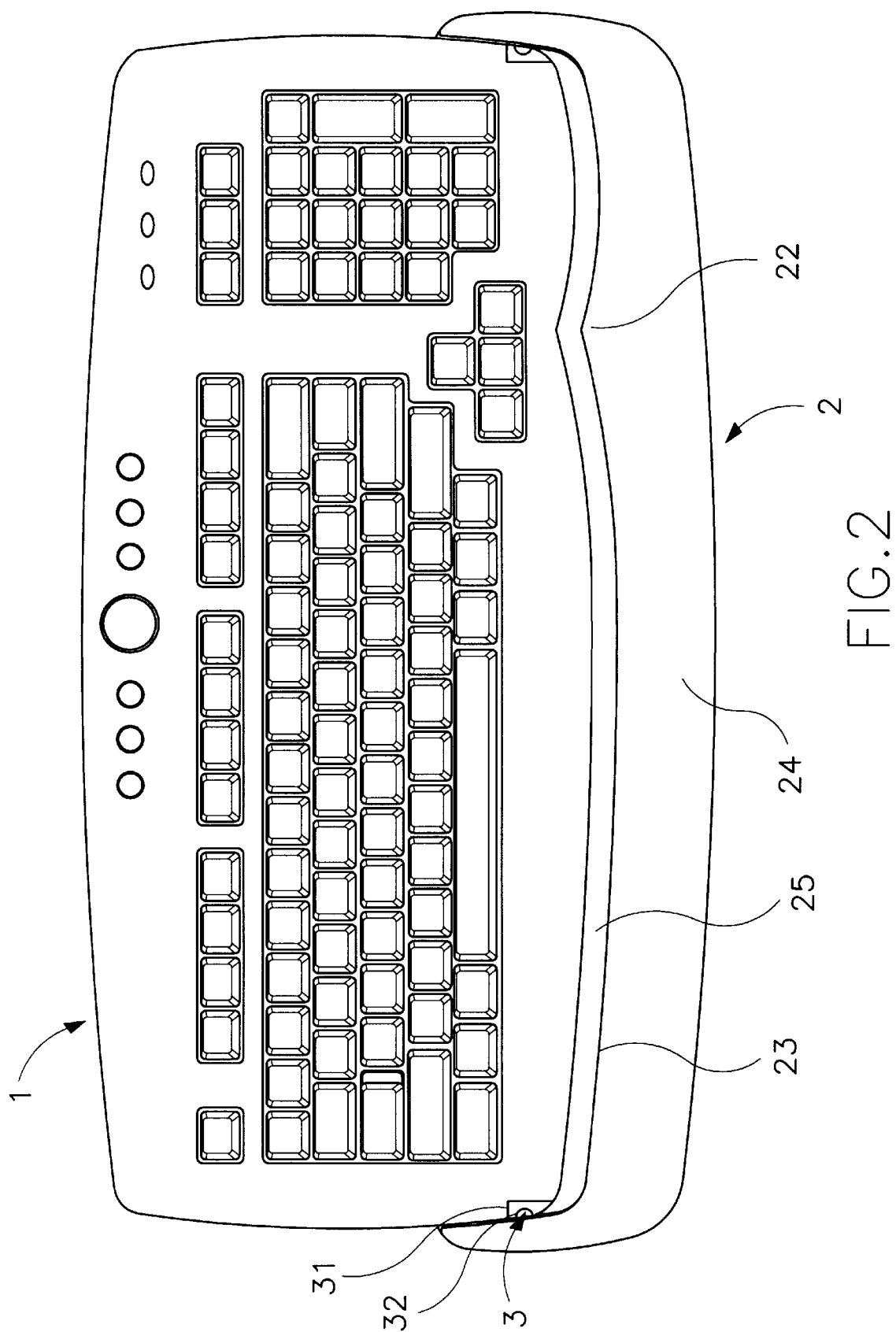
FIG. 2 is a top view of FIG. 1.
Figure 3:
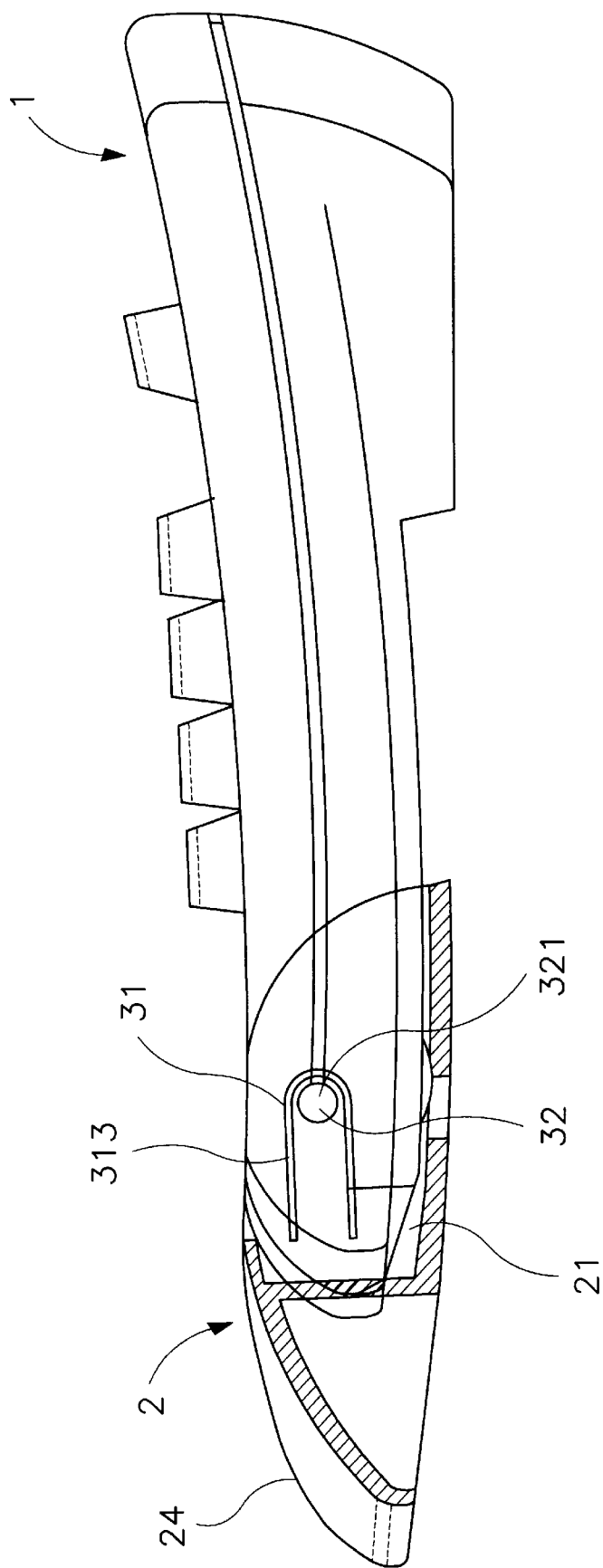
FIG. 3 is a partial cross-sectional view of FIG. 1.

Referring to FIGS. 1–3, there is shown a detachable wrist rest 2 assembled with a keyboard 1 according to the present invention. Wrist rest 2 is a generally U-shaped body with a recessed portion 21 conformed to and firmly attached to the lower part of keyboard 1 by a snap based mechanism (as detailed later). Wrist rest 2 has a wave-shaped rear side surface 22 which having a transverse peak line 23 between a first curved surface 24 and a second curved surface 25. A snap based mechanism 3 is provided between each of two side junctions contacting keyboard 1 and wrist rest 2. Snap based mechanism 3 comprises a first snap member 31 provided on an outer side surface of keyboard 1 and a second snap member 32 provided on an inner side surface of wrist rest 2. First snap member 31 is implemented as a U-shaped cavity 313 with the opening toward wrist rest 2, while second snap member 32 is implemented as a raised member 321 having a size generally equal to the width of U-shaped cavity 313. As such, raised member 321 can fit snugly within U-shaped cavity 313. Likewise, the disposition of U-shaped cavity 313 and raised member 321 can be reversed.

FIG. 4A is a first embodiment of a snap based mechanism 3 in which first snap member 31 is implemented as a cavity 311, while second snap member 32 is implemented as a raised member 321 for fitting snugly within cavity 313. Likewise, the disposition of cavity 313 and raised member 321 can be reversed.

Figure 4C:
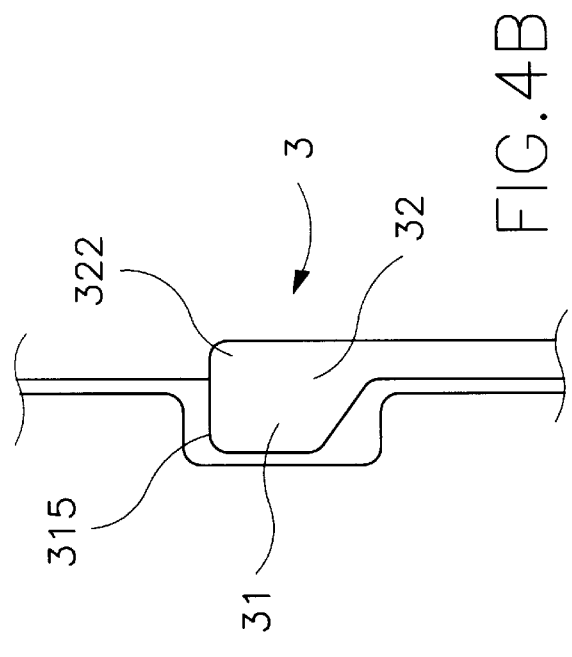
Figure 4C:
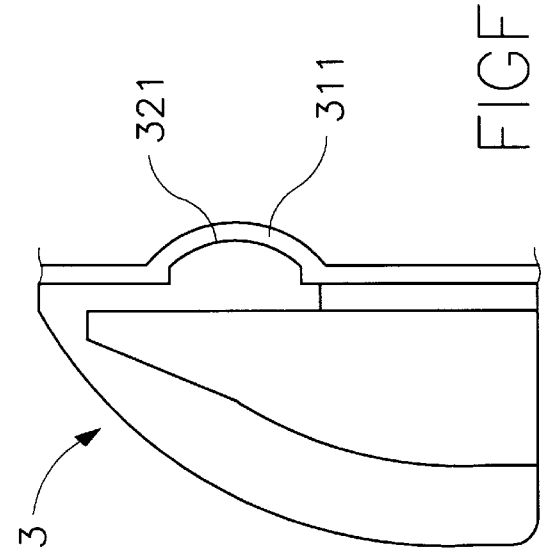
Figure 4B:
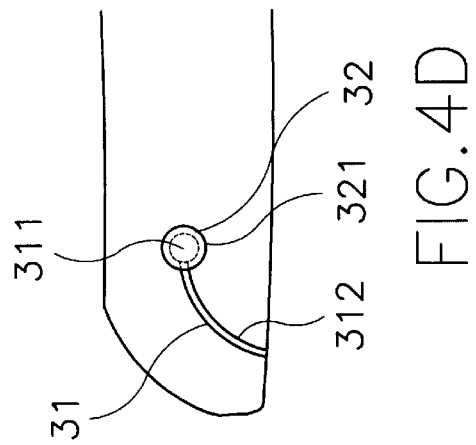

FIG. 4B is a second embodiment of a snap based mechanism 3 in which first snap member 31 is implemented as a hook-shaped recessed member 315, while second snap member 32 is implemented as a raised element 322 for fitting snugly within hook-shaped recessed member 315. Likewise, the disposition of hook-shaped recessed member 315 and raised element 322 can be reversed.

FIG. 4C is a third embodiment of a snap based mechanism 3 in which first snap member 31 is implemented as an extended groove 314 with an arcuate section, while second snap member 32 is implemented as a raised member 321 for fitting snugly within groove 314. Likewise, the disposition of groove 314 and raised member 321 can be reversed.

Figure 4D:
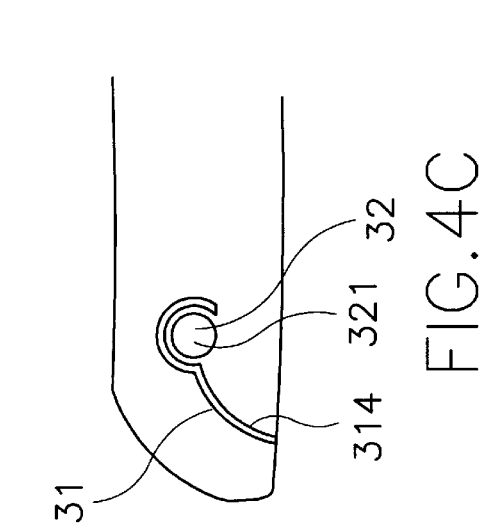

FIG. 4D is a fourth embodiment of a snap based mechanism 3 in which first snap member 31 is implemented as a cavity 311 having a front guide slot 312, while second snap member 32 is implemented as a raised member 321 capable of slidingly moving up for fitting snugly within cavity 311. Likewise, the disposition of cavity 311 and raised member 321 can be reversed.

While the invention herein disclosed has been described by means of specific embodiments, numerous modifications and variations could be made thereto by those skilled in the art without departing from the scope of the invention set forth in the claims.

What is claimed is:

1. A keyboard assembly comprising:
   (a) a keyboard having a pair of side portions and a front portion extending therebetween;
   (b) a wrist rest coupled to said keyboard, said wrist rest having a substantially U-shaped general contour defined by a pair of opposing end portions and an intermediate portion extending therebetween; and,
   (c) at least a pair of snap based mechanisms each coupling together one said keyboard side portion and one said wrist rest end portion, each said snap based mechanism including mutually engaging first and second snap members respectively formed on said keyboard side portion and said wrist rest end portion coupled thereto.

2. The keyboard assembly as recited in claim 1 wherein said intermediate portion of said wrist rest has formed therein a recessed portion receptively engaging said front portion of said keyboard.

3. The keyboard assembly as recited in claim 1 wherein said intermediate portion of said wrist rest includes a curvilinear edge opposing said keyboard.

4. The keyboard assembly as recited in claim 1 wherein said intermediate portion of said wrist rest includes first and second arcuate surfaces describing a transverse peak line therebetween.

5. The keyboard assembly as recited in claim 1 wherein at least one of said first and second snap members of at least one said snap based mechanism includes a substantially U-shaped cavity open toward said wrist rest, and the other of said first and second snap members thereof includes a raised member protruding into said cavity.

6. The keyboard assembly as recited in claim 5 wherein said raised member of said snap based mechanism is sectionally dimensioned for substantially fitted engagement of said cavity.

7. The keyboard assembly as recited in claim 6 wherein said first snap member of at least one said snap based mechanism includes said cavity open toward said wrist rest, and said second snap member thereof includes said raised member protruding into said cavity.

8. The keyboard assembly as recited in claim 6 wherein said second snap member of at least one said snap based mechanism includes said cavity open toward said wrist rest, and said first snap member thereof includes said raised member protruding into said cavity.

9. The keyboard assembly as recited in claim 1 wherein at least one of said first and second snap members of at least one said snap based mechanism includes a cavity, and the other of said first and second snap members thereof includes a raised member in substantially fit engagement with said cavity.

10. The keyboard assembly as recited in claim 1 wherein at least one of said first and second snap members of at least one said snap based mechanism includes a substantially hook-shaped recess, and the other of said first and second snap members thereof includes a raised element in substantially fit engagement with said recess.

11. The keyboard assembly as recited in claim 1 wherein at least one of said first and second snap members of at least one said snap based mechanism includes an extended groove having an arcuate sectional contour, and the other of said first and second snap members thereof includes a raised member in substantially fit engagement with said groove.

12. The keyboard assembly as recited in claim 1 wherein at least one of said first and second snap members of at least one said snap based mechanism includes a cavity having a front guide slot, and the other of said first and second snap members thereof includes a raised member slidably engaging said cavity.

\* \* \* \* \*